Apr. 10, 1923.

H. A. PERKINS 1,451,630

VEHICLE BRAKE

Filed Nov. 18, 1920

2 sheets-sheet 2

WITNESSES
Wynne Johnson

INVENTOR
Henry A. Perkins,
BY
ATTORNEYS

Patented Apr. 10, 1923.

1,451,630

UNITED STATES PATENT OFFICE.

HENRY ALPHONSO PERKINS, OF EAST TEMPLETON, MASSACHUSETTS.

VEHICLE BRAKE.

Application filed November 18, 1920. Serial No. 424,891.

*To all whom it may concern:*

Be it known that I, HENRY ALPHONSO PERKINS, a citizen of the United States, and a resident of East Templeton, in the county of Worcester and State of Massachusetts, have invented certain new and useful Improvements in Vehicle Brakes, of which the following is a specification.

This invention relates to vehicle brakes, and more particularly to a brake construction adapted for use in connection with light vehicles, such as baby carriages, baby strollers, baby sulkies, or like wheeled vehicles of the doll-type.

It is the object of the invention to provide a brake which may be applied to the tire of the wheels and particularly the rear wheels, and which may be readily put on or off without the necessity of mutilating the tips of the shoes or requiring upward movement of a braking lever in such a manner as to necessitate that the caps of the shoes be pressed upwardly against the lever, thus avoiding scratching, mutilation or disfiguring and scarring of the tips of shoes, and providing a device which requires but a single operating lever which may be engaged by the sole of the shoe and operated to engage or release the brake by downward and forward pressure, thus obviating the objections above noted and providing a simple, efficient and economical device, which can be readily applied to vehicles as at present constructed, or during the process of manufacture thereof, without alteration, weakening or disfiguring the structure of the carriage or other hand propelled vehicle.

Figure 1:
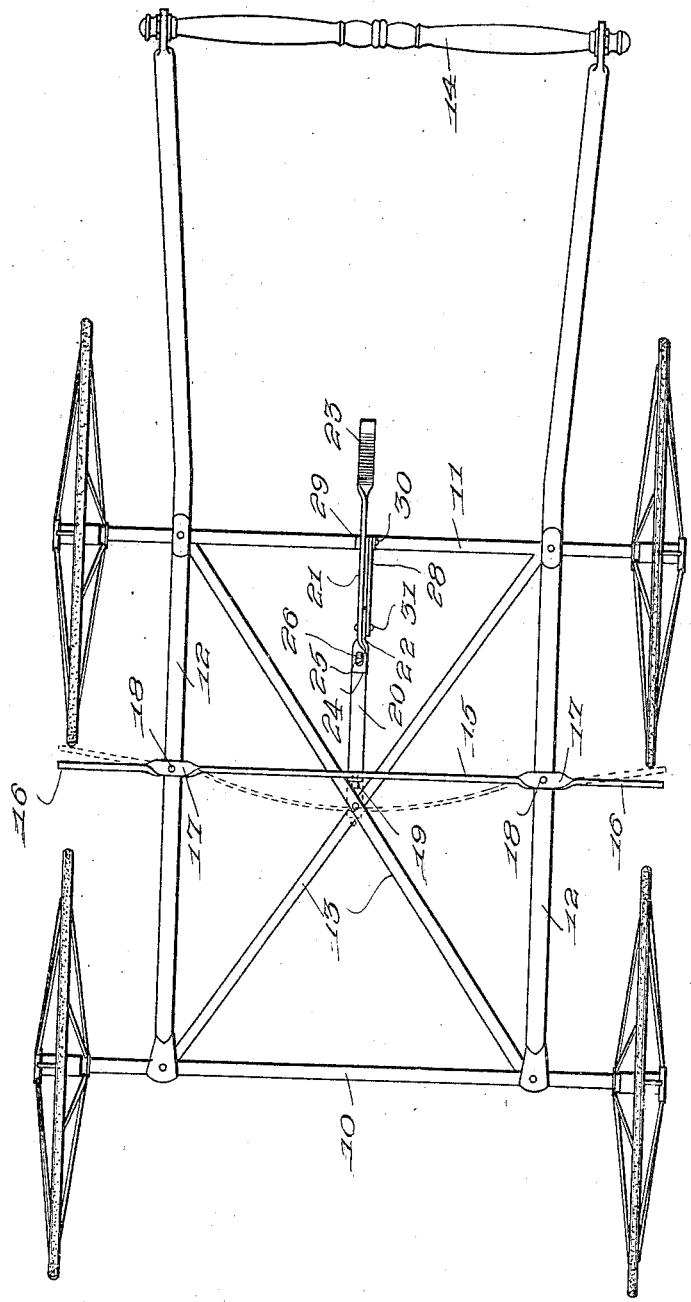
Figure 2:
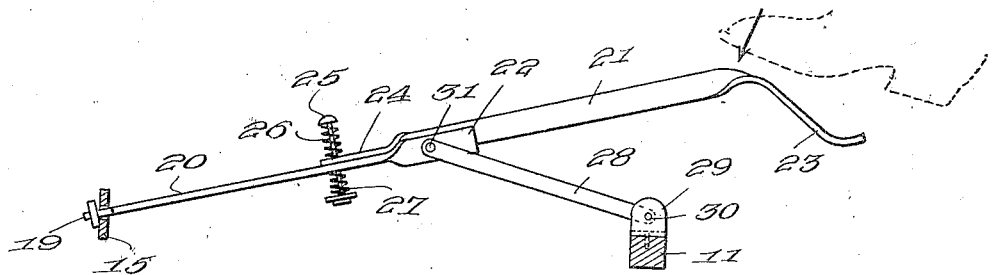
Figure 3:
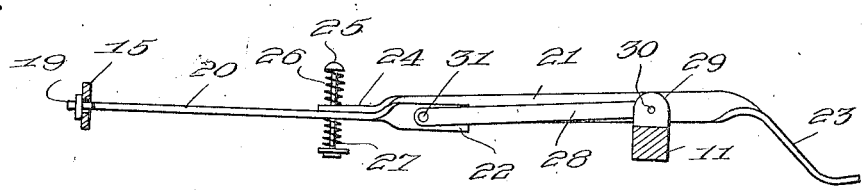
Figure 4:
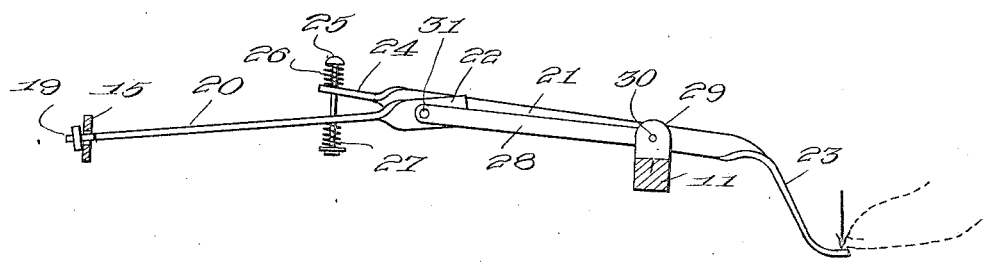

Other and further objects of my invention will become readily apparent to persons skilled in the art, from a consideration of the following description when taken in conjunction with the accompanying drawing, in which:

Figure 1 is a plan view of the running gear of a baby carriage constituting one form of vehicle propelled by hand and having the improved brake applied thereto, Figure 2 is a sectional view on an enlarged scale, of the brake actuating mechanism shown in Figure 1 when the brakes are put off or released, Figure 3 is a view similar to Figure 2 but showing the parts in position when the brake is put on or applied, and Figure 4 is a similar view but showing the manner of releasing the brake, as distinguished from the manner of applying the same, as shown in Figure 2 of the drawings.

Referring to the drawings in detail, and particularly to Figure 1, I have shown the running gear of a baby carriage employing or embodying front and rear axles 10 and 11 connected by perches 12 and braced by hounds 13. Conveniently, the perches 12 may be extended upwardly as indicated in Figure 1 to support the cross bar 14, forming a handle by which the carriage may be propelled in the usual manner.

In the present embodiment of the invention, the rear wheels are braked, and for this purpose I have shown a brake bar 15 conveniently in the form of a resilient strip, the extreme ends 16 of which project adjacent the rear wheels and are adapted to serve as brake shoes. The bar 15 may be twisted adjacent to the perches or parallel push bars 12 to form horizontally flat portions 17 fitting the surfaces of the perches, preferably at the bottom, and facilitating pivoting the bar thereto by means of the pivot pins 18. If the bar 15 is sprung to the dotted line position shown in Figure 1 of the drawings, the end portions 16 will be swung into contact with the wheels and brake the same.

The spring steel flexible brake beam or bar is loosely riveted to the perches, both ends of the brake beam or bar extending beyond the perches at a suitable distance on the rear axle to allow their ends to engage the wheel tires when said ends are brought backward or bent toward the rear axle. These ends are caused to bend backward by forcing the middle section of the flexible brake beam away from the rear axle and as shown, said bar is apertured to receive the reduced forward end 19 of a link 20 forming part of an articulated or sectional connection including a lever 21 extended over the rear axle 11 and having its main portion vertically disposed to correspond to the rear portion 22 of the link 20 so as to movably fit or contact therewith and having its rear portion horizontally extended and bent downwardly and horizontally as shown at 23, to form a suitable foot engaging portion or treadle.

The forward end of the link 21 beyond the vertical portion thereof, and the vertical portion 22 of the link 20, which latter is normally horizontally disposed or at right angles to the rear portion 22, is also twisted to form a horizontal portion 24 which together with the link 20 is apertured vertically, the apertures being in alinement to receive a bolt or pin 25 between the headed ends of which and the link 20 and portion 24, are disposed expansible helical springs 26 and 27 which serve to keep the section or link 20 and the lever 21 in alinement while permitting angular movements thereof one with respect to the other as and for the purpose to be hereinafter set forth. The rear vertical portion 22 of the link 20 is connected pivotally by means of a link or rod 28 to the rear axle 11, suitable apertured ears or a clip 29 being provided upon the rear axle intermediately thereof, for pivotally connecting the link or rod 28 thereto, as shown at 30. The pivotal connection of the link or rod 28 with the vertical portion 22 of the link 20, forming a section of the articulated connection above referred to, is indicated at 31, and is in the form of a rivet so as to operate clear and free of the lever or section 21.

The normal position of the parts when the brake bar is straight and unstrained, with the brake unapplied or disengaged, and in the full line position indicated in Figure 1 of the drawings, is shown in Figure 2, when the lever 21 will be raised into alinement with the link 20 by the springs 26 and 27, the link 28 being also raised on its pivot to break the articulated connection between the rear axle and the brake bar so as to relieve the bar of strain in a forward direction. However, when pressure is exerted on the treadle as indicated in Figure 2, it will be forced downwardly against the rear axle at the lever 21, thus straightening the joints and also the articulated connection formed between the links 20 and 28, the pivot 31 connecting the parts 20, 21 and 28, and the spring furnishing sufficient tension to assist in holding the parts in this relation. In this way, the central portion of the bar will be pushed forwardly to the dotted line position shown in Figure 1, the middle portion being sprung and the end portions moved rearwardly against the wheels, the parts then being in the position shown in Figure 3 of the drawings. When it is desired to release the brakes, pressure is exerted further in the manner shown in Figure 4 of the drawings, thus moving the link 20 on its pivot 31 against the action of the springs 26 and 27 to separate the forward portion 24 of the lever 21 from the link 20 and raising the pivotal connection so as to relieve the brake bar of strain and permit it to straighten out. The release of the foot from the treadle will then permit the springs 26 and 27 to return the lever 21 to the position shown in Figure 2 of the drawings, and the operation may be carried out without engaging the tips or caps of the shoe in an upward direction in a manner to scratch or otherwise mutilate the same and by means of a single lever. It is of course to be understood that the treadle is arranged to force the pivot 31 beyond the dead center in order that it will remain in the applied position with the brake shoes thrust against the wheels, so that the same will remain in this position until released, as shown in Figure 4 of the drawings and above described.

It will thus be seen that scratching or marring of the shoes will be prevented while permitting the brakes to be applied or disengaged by means of a single foot treadle or lever which can be conveniently operated by the person pushing the vehicle by means of the handle 14, or to other suitable type of vehicle to which the invention is equally as well applicable. The device may be operated without stooping by merely reaching the foot from a standing position and pressing downwardly upon the treadle in the manner above described, depending upon the position of the device.

It will also appear that the link or locking lever 28 will serve to retain the parts in the operative position shown in Figure 3, after the pivot passes over the dead center. It will also appear that the sole of the foot is applied to the treadle or lever 21 at the point of formation of the lever proper and the inclined treadle portion, when applying the brakes, while the toe of the shoe is applied to the extreme end of the treadle portion which is bent horizontally substantially parallel to the lever 21, as indicated in Figure 4, in order to release the brake from the position shown in Figure 3 of the drawings. In the first instance, downward pressure is exerted at the pivot point of the connection and consequently depression of the levers or links, while in the latter instance, the downward pressure will cause upward movement of the links at the pivotal connection in order to break the articulated connections from the positions in a straight line, or below the dead center. When the device is moved to the position shown in Figure 3, the lever 21 will rest upon the rear axle 11 and the latter will act as a fulcrum for said lever when the tension of the springs is overcome, in breaking the joint to release the brakes. In this way, the pivotal connection will be elevated in the manner shown in Figure 4, so as to break the joints or connections. When the pressure is released, the springs will then act to return the parts to the position shown in Figure 2, in a straight line.

While I have described the specific embodiment of the invention shown, it is to be understood that certain changes in the minor details of construction and arrangement of parts may be made without departing from the spirit of the invention. It is also thought that in view of the foregoing the operation of the device will be readily understood and in view of the simplicity and practical value, that it will commend itself to those skilled in the art.

Having thus described my invention, what I claim is:—

1. In a vehicle of the class described, a brake, means for pressing the same against the wheel, and a single depressible treadle for actuating and releasing said means by successive movements in the same direction.

2. In a vehicle of the class described, a brake, means for pressing the same against the wheel, and a single depressible treadle for actuating and releasing said means by movement in the same direction.

3. In a vehicle as described, a brake, means for pressing the same against the wheels, and a single depressible treadle for actuating and releasing said means by two downward movements in succession.

4. In vehicle brakes, a spring bar, a link having a reduced end engaged therewith to flex said bar forwardly, whereby the outer ends thereof are disposed rearwardly, and a single operating member connected to said link for manipulating the same to engage and release the brake by two successive movements in the same direction.

5. In vehicle brakes, a spring bar, a link having a reduced end engaged therewith to flex said bar forwardly, whereby the outer ends thereof are disposed rearwardly, and a single operating lever connected to said link for manipluating the same, said link and lever having cooperating means for holding the bar in engaged or disengaged positions.

6. In vehicle brakes, a spring bar, a link having a reduced end engaged therewith to flex said bar forwardly, whereby the outer ends thereof are disposed rearwardly, said link being provided with a foot treadle adapted to be actuated successively in the same direction for applying and releasing the brakes.

7. The combination with the usual running gear of a vehicle as described, a brake comprising a spring bar pivoted to the perches and having portions presented adjacent to the wheels, an articulated connection disposed between said bar and an axle, and a lever pivoted to the joint of the articulated connection and extended rearwardly to form a treadle adapted to apply and remove the brake by two pressures in the same direction.

8. The combination with the usual running gear of a vehicle having perches as described, a brake comprising a spring bar pivoted to the perches and having portions presented adjacent to the wheels, an articulated connection disposed between said bar and an axle and comprising a link connected to the bar and a second link pivoted to the first link, a lever pivotally connected to the pivotal connection of the links forming the articulated connection and having a foot treadle extended downwardly from the rear end thereof, the forward end of the lever extending forwardly of said pivotal connection, a bolt freely engaged with said extended end and first named link of the articulated connection having connection with the bar, and a spring on the loose connection between the ends thereof and said first named link and extended end of the lever.

9. The combination with a resilient brake bar and a stationary support of a link having connection with said bar to exert forward movement against the same, said bar being normally straight and adapted to be flexed intermediately to force the outer ends thereof in the opposite direction, a second link connecting the other end of the first link to the axle pivotally, a lever having pivotal connection at a common point between the first and second named links and having a forwardly extended end portion disposed to engage the first named link, the rear end extending downwardly to form a treadle, a bolt extending through alined apertures in the extended end of the lever and in the adjacent portion of the first named link, and expansible coil springs on the bolt between the heads thereof and the link and lever.

10. The combination with a resilient brake bar and a stationary support; of a link having connection with said bar to exert forward movement against the same, said bar being normally straight and adapted to be flexed intermediately to force the outer ends thereof in the opposite direction, a second link connecting the other end of the first link to the axle pivotally, a lever having pivotal connection at a common point between the first named link and lever and having a forwardly extended end portion disposed to fit against the first named link, the rear end extending downwardly to form a treadle, and a resilient connection between the extended end of the lever and the adjacent portion of the first named link to hold the same normally in alinement but adapted to permit angular movement thereof respectively to permit separation of the forward end, whereby said links and lever may be moved to angular relation or in alinement for releasing or applying the brakes, substantially in the manner as and for the purposes specified.

11. In a vehicle as described, an articulated connection adapted to be broken upwardly and to be straightened downwardly below the dead center to release or apply the same respectively against a wheel, and a single depressible treadle for straightening or breaking the articulated connection by successive movements in one direction.

12. In a vehicle running gear comprising a transverse bar at one end thereof, a brake bar, an articulated connection interposed between said bars, and a single depressible treadle for breaking or applying the same by application of downward pressure thereon successively at two points in one direction.

13. In a vehicle running gear comprising a transverse bar at one end thereof, a brake bar, an articulated connection interposed between said bars, a treadle connected to said articulated connection at the pivot thereof and extending rearwardly, means to limit the downward movement thereof bodily, the forward end thereof being projected beyond the pivot, a resilient connection permitting limited angular movement between the projected end of the lever and one section of the connection.

HENRY ALPHONSO PERKINS.